June 5, 1962 A. G. SCHILBERG 3,037,271
METHOD OF FABRICATING VEHICLE CONTROL ARMS
Filed Jan. 28, 1958 2 Sheets-Sheet 1

INVENTOR.
ARNOLD G. SCHILBERG
BY
Andrus + Starke
ATTORNEYS

June 5, 1962　　　A. G. SCHILBERG　　　3,037,271
METHOD OF FABRICATING VEHICLE CONTROL ARMS
Filed Jan. 28, 1958　　　　　　　　　　　　2 Sheets-Sheet 2

INVENTOR.
ARNOLD G. SCHILBERG
BY
Andrus + Starke
ATTORNEYS

United States Patent Office 3,037,271
Patented June 5, 1962

3,037,271
METHOD OF FABRICATING VEHICLE
CONTROL ARMS
Arnold G. Schilberg, Milwaukee, Wis., assignor to A. O. Smith Corporation, Milwaukee, Wis., a corporation of New York
Filed Jan. 28, 1958, Ser. No. 711,638
2 Claims. (Cl. 29—415)

This invention relates to a method of fabricating structural members and particularly to a method of fabricating vehicle control arms for use in independent wheel suspension systems.

Generally, the wheel suspension system for vehicles or the like includes an upper and a lower control arm with the typical lower vehicle control arm comprising a pair of wish-bone shaped arms connected by a tray-like plate providing a spring seat therebetween. The inner ends of the arms are pivotally attached to a shaft which in turn is connected to the frame of the automobile.

The upper control arm which is substantially smaller than the lower arm is also of wish-bone shape and is provided with a tray-like plate serving to connect the arms. The inner ends of the upper arm are pivotally connected to the vehicle frame in the same manner as the inner ends of the lower arm. The outer ends of the upper and lower control arm are connected to a vertically extending wheel supported member by means of a ball and socket joint provided at the outer end of each arm.

Either control arm may be fabricated as a one-piece structure by initially stamping from a sheet of metal a blank corresponding in size and shape to that of the preformed arm and subsequently placing the blank between a pair of dies and forming it into the contoured control arm. This method of fabrication, while requiring but one pair of dies and one forming operation, wastes excessive amounts of sheet metal due to the one piece construction which minimizes the amount of nesting possible in stamping successive blanks.

On the other hand, the control arm may be fabricated as a multi-piece structure, comprised of the individual arm members and the connecting tray-like plate member. In the multi-piece arm, each member of the control arm is individually stamped from sheet metal and then formed individually between distinct and separate sets of dies. The formed members are subsequently welded or otherwise secured together to complete the control arm. The arm fabricated according to this method economizes on sheet metal as each individual member may be nested on the sheet metal and blanked in large numbers with little waste of metal.

However, due to the relatively high cost of dies, the control arm fabricated according to this method is relatively expensive inasmuch as three separate sets of dies are required. Furthermore, in the case of numerous, low volume orders each requiring control arms of different specifications, the cost of the dies makes this method almost prohibitive and/or non-competitive with the one-piece type control arm.

According to the method of the invention, each member of the control arm is individually blanked from the metal sheet, laid out in overlapping fashion, attached to one another by rivets or the like and subsequently placed between a set of dies and formed into the control arm. Thus, not only is the control arm fabricated according to the invention of the mutli-piece construction, thereby representing a considerable saving of stock material, but further only one set of dies is required in the forming operation.

Accordingly, it may be stated that an object of this invention is the fabrication of a vehicle control arm by a method which minimizes both waste of stock material and tool cost.

Further objects of the invention will become apparent during the course of the following description.

The drawings illustrate the best mode presently contemplated of carrying out the invention.

Figure 1:
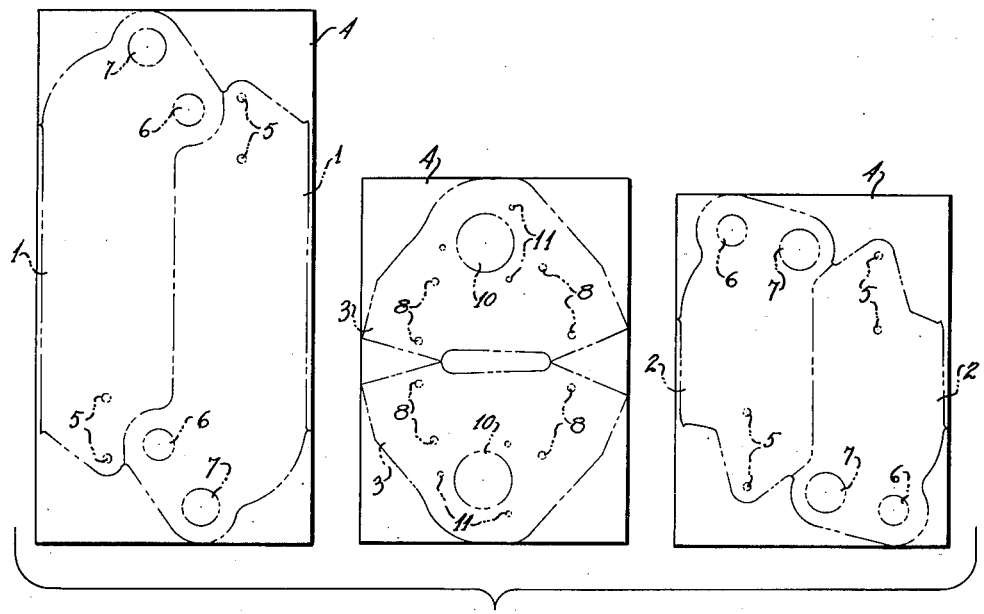
FIG. 1 represents a series of sheets of stock material out of which the members of the vehicle control arm are stamped illustrating one manner in which the blanks may be nested.
Figure 2:
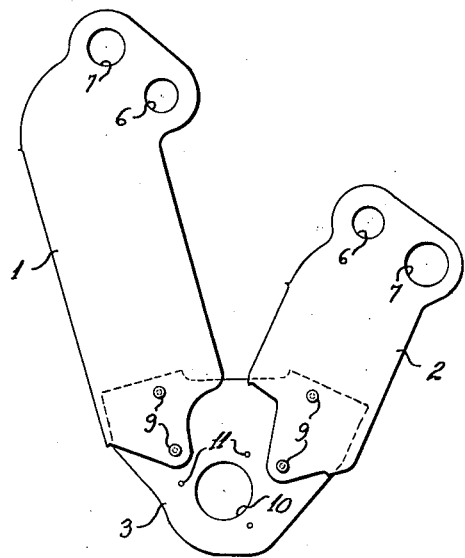
FIG. 2 illustrates the blanks disposed in overlapping fashion and integrally connected to one another prior to forming the control arm.
Figure 4:
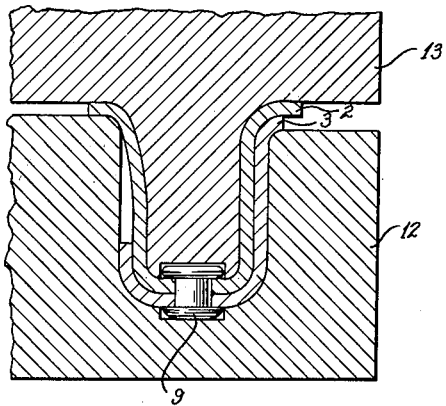
FIG. 4 is a sectional view along line 4—4 of FIG. 3 illustrating the control arm disposed between suitable dies.

Referring to the drawings, the control arm, in this case the upper control arm, comprises in general, a pair of arms 1 and 2 connected by a tie plate 3. Each of the arms 1 and 2 is formed from sheet metal and has a flanged channel-shaped cross section. Tie plate 3 is also formed from sheet metal and is substantially triangular shaped with an apertured center portion adapted to receive the upper end of a ball and socket joint, not shown.

According to the invention, the control arm is fabricated by initially stamping a metal sheet or series of sheets 4 to obtain arm blanks 1 and 2 and tie plate blank 3. Economy of sheet material may be practiced by nesting the blanks on the metal sheet 4 in a manner such as shown in FIG. 1. In the case of the arm blanks, by nesting identically shaped blanks in pairs and in reverse fashion to one another, scrap waste in stamping each pair of arm blanks is reduced to the relatively small amount of metal at either end of the blanks.

Scrap waste between successive pairs of arm blanks and between successive tie plate blanks, while not eliminated altogether, may be reduced to a minimum as seen in FIG. 1. Such conservation of scrap waste is precluded in the fabrication of a one-piece control arm as the amount of nesting possible in successive blanks is limited due to the irregular shape of the blank. In particular, in the fabrication of a control arm having channel-shaped arm members of the type described previously, the sheet metal disposed between the radially extending arms is substantially wasted as there is insufficient clearance between the inner edges of the arms to receive the nose or point of a second blank.

The individual blanks are pierced prior to the forming operation to provide necessary openings for attaching the blanks to one another and for assembly purposes in the finished arm. Each arm blank is provided with a pair of like openings 5 at the outer end thereof through which rivets are subsequently extended. The inner end of each arm blank is provided with openings 6 and 7 with opening 7 being slightly larger than opening 6. In the formed control arm, these openings are disposed in alignment in the vertically extending flanges of the arm with opening 6 being enlarged outwardly relative to opening 7 to provide an embossment. A bearing shaft, not shown, is subsequently inserted through each pair of aligned openings 6 and 7 and is secured to the vehicle frame to provide a pivotal connection between the latter and the control arm.

Suitable openings 8 are also punched in tie plate blank 3 which when aligned with similar openings 5 in each arm blank receive rivets 9. The centrally disposed portion of the tie plate blank is provided with an opening 10 to receive the upper end of the ball joint and a series of smaller openings 11 are disposed radially outwardly of opening 10 to receive bolts or the like carried by the ball joint connecting means.

The outer ends of the arm blanks 1 and 2 are positioned on tray blank 3 in overlapping fashion with openings 5 aligned with the corresponding openings 8 in tie plate 3. Rivets 9 are then inserted through the aligned openings 5 and 8 and subsequently beaded to secure the arm blanks to the tie plate blank. It will be noted that a substantial portion of the tie plate blank is overlapped by the outer ends of the arm blank.

This overlapping area presents a fairly large surface contact area between the arms and the tray with the surfaces held intimately together by rivets 9. With this construction, the arm and tray members cooperate to provide a strong integral structure as loads applied to one member will be carried by all the members. However, since the overlapping metal adds to the weight of the control arm and represents an amount of metal additional to that used in the integral or one-piece control arm, it is not economically or structurally sound to overlap indiscriminately.

Figure 3:
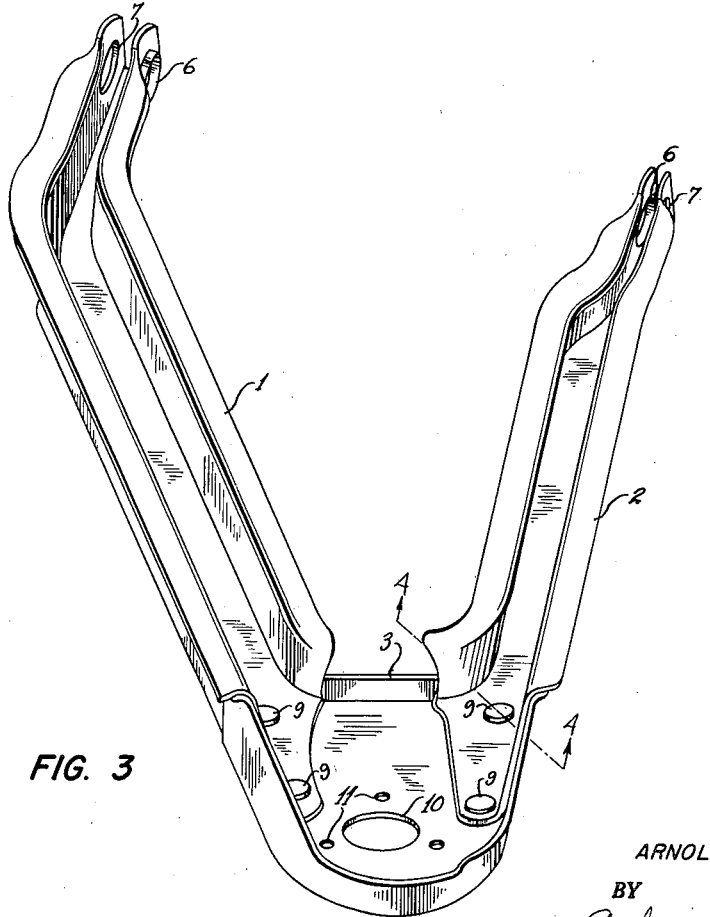
FIG. 3 is a perspective view of the control arm after withdrawal of the same from the dies.

The riveted blanks are then formed into the control arm by means of die 12 and ram 13 with clearance being provided between die 12 and ram 13 to accommodate the protrusion formed by the ends of rivets 9. As shown in FIG. 3, the arms attain a generally inverted channel-shaped cross-sectional area with the tie plate remaining generally flat throughout except for the peripheral edge which is turned upwardly and in that portion of the plate which is overlapped by the arm members, formed to the contour of the respective portion of the arm members.

While the method of the invention has been described in connection with the upper control arm of a vehicle suspension system, the method is equally applicable to the lower control arm.

Furthermore, the invention is equally applicable to control arms having arm members with a cross-section area other than channel shaped. For instance, Z-shaped arms could also be fabricated by this method, as the only requirement for the method of the invention is that the cross-sectional area is such that conventional forming tools may be utilized to form the control arm in a single operation.

The method of the invention is particularly useful in fabricating structural members comprised of a plurality of members which have been formed individually and subsequently attached to one another or for fabricating integral structural members which are initially stamped from sheet metal to obtain a blank which is subsequently formed between dies where due to the configuration of the blank, economical nesting of blanks for fabricating successive members is precluded.

The method of the invention renders it possible to form a multi-piece control arm with one set of forming dies which greatly reduces the expense of dies.

Additionally, since the arm fabricated according to this invention is of the multi-piece construction, there is a considerable saving of stock material as compared to integral control arms.

Various modes of carrying out the invention are contemplated as being within the scope of the following claims particularly pointing out and distinctly claiming the subject matter which is regarded as the invention.

I claim:

1. In the method of fabricating a control arm for a vehicle frame wherein the control arm is comprised of a pair of sheet metal arms having a generally channel-shaped cross section and having one end portion of each arm connected to a sheet metal tray to form a generally wish-bone shaped structure, the steps including individually stamping the arms and tray in flat blank form from a metal sheet, securing the arm blanks to the tray blank in an overlapping relation to obtain a substantially flat composite assembly with the arm blanks diverging outwardly in a V-shaped configuration in a manner corresponding to their relationship in the completed control arm, locating the flat composite assembly between dies and forming the assembly to a channel-shaped cross-sectional configuration in a single forming operation.

2. A method of making a vehicle control arm from a composite metal blank, comprising initially stamping a tray blank and a pair of arm blanks of irregular configuration from a metal sheet, piercing a plurality of openings in each individual blank, disposing the tray blank and the arm blanks in relation to each other to form a generally V-shaped flat blank member, riveting said blanks permanently together to form a composite metal blank of generally V-shaped configuration, disposing said composite blank in a generally V-shaped die, and forming said composite blank in a single forming operation into a substantially V-shaped control arm having bolt openings therein.

References Cited in the file of this patent

UNITED STATES PATENTS

| | | |
|---|---|---|
| 1,574,563 | Duff | Feb. 23, 1926 |
| 1,808,731 | Ireland | June 2, 1931 |
| 1,887,494 | Murray | Nov. 15, 1932 |
| 1,945,505 | Crowe | Jan. 30, 1934 |
| 2,330,602 | LeTourneau | Sept. 28, 1943 |